(12) United States Patent
Nakajima

(10) Patent No.: US 7,584,774 B2
(45) Date of Patent: Sep. 8, 2009

(54) PNEUMATIC RADIAL TIRE WITH POLYETHYLENE TEREPHTHALATE CORD BELT REINFORCING LAYER

(75) Inventor: Daisuke Nakajima, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 638 days.

(21) Appl. No.: 10/574,618

(22) PCT Filed: Oct. 1, 2004

(86) PCT No.: PCT/JP2004/014484

§ 371 (c)(1), (2), (4) Date: Apr. 5, 2006

(87) PCT Pub. No.: WO2005/032854

PCT Pub. Date: Apr. 14, 2005

(65) Prior Publication Data

US 2007/0006957 A1 Jan. 11, 2007

(30) Foreign Application Priority Data

Oct. 6, 2003 (JP) ............................. 2003-346951

(51) Int. Cl.
B60C 9/22 (2006.01)
B60C 9/20 (2006.01)

(52) U.S. Cl. .................. 152/527; 152/531; 152/533

(58) Field of Classification Search ............... 152/527, 152/531, 533
See application file for complete search history.

(56) References Cited

FOREIGN PATENT DOCUMENTS

| EP | 1 495 800 A | 1/2005 |
|----|-------------|--------|
| EP | 1 710 097 A | 10/2006 |
| JP | 09-066705 A | 3/1997 |
| JP | 2000-248254 A | 9/2000 |
| JP | 2001-063312 A | 3/2001 |
| JP | 2001-180220 A | 7/2001 |
| JP | 2003-220806 A | 8/2003 |

OTHER PUBLICATIONS

English machine translation of Japanese Patent Application 2001-63312 A, Mar. 13, 2001.*

* cited by examiner

Primary Examiner—Adrienne C Johnstone
(74) Attorney, Agent, or Firm—Sughrue Mion, PLLC

(57) ABSTRACT

This invention relates to a pneumatic radial tire having low road noise and flat spot and a high high-speed durability, and more particularly to a pneumatic radial tire comprising a radial carcass (5), a belt (6) disposed outside a crown portion of the carcass in a radial direction and comprised of at least two belt layers, and a belt reinforcing layer (7A, 7B) disposed outside the belt in the radial direction, characterized in that the belt reinforcing layer 7A, 7B is formed by continuously and spirally winding a polyethylene terephthalate cord(s) in a circumferential direction of the tire, and this cord has an elastic modulus of not less than 2.5 mN/dtex·% under a load of 29.4 N measured at 160° C.

11 Claims, 2 Drawing Sheets

PNEUMATIC RADIAL TIRE WITH POLYETHYLENE TEREPHTHALATE CORD BELT REINFORCING LAYER

TECHNICAL FIELD

This invention relates to a pneumatic radial tire, and more particularly to a pneumatic radial tire having low road noise and flat spot and a high high-speed durability.

BACKGROUND ART

Currently, at least two belt layers containing steel cords arranged slantly at a certain cord angle with respect to an equatorial plane of a tire are mainly used in a belt of a radial tire for a passenger car such that the cords of these layers are crossed with each other. Also, a belt reinforcing layer comprising nylon cords or the like is disposed on an outside of the belt in a radial direction in order to ensure the stability during the running of the tire and particularly prevent the peeling of the belt layer in the high-speed running (particularly, peeling notably produced at an end portion of the belt layer) to improve the durability.

At the present day, it is common to adopt the belt reinforcing layer for improving the high-speed durability. As a material of the cord in the belt reinforcing layer is mainly used a nylon being low in the heat build-up and cost. In the radial tire having such a belt reinforcing layer, however, it is recently demanded to further reduce the road noise and flat spot and improve the pushing-out property at the end portion of the belt in the high-speed running.

As such a countermeasure, a high-elastic cord composed of an aromatic polyamide (aramid) or the like, which has an elasticity higher than that of the nylon and a high glass transition point (Tg) and is effective for the lowering of the road noise and flat spot, is applied to the belt reinforcing layer. However, the high-elastic cord has a problem in view of the cost because it is expensive.

Moreover, as a material having an elasticity higher than that of the nylon but being low in the cost is known a polyethylene terephthalate (PET). However, the polyethylene terephthalate is large in the lowering of the elastic modulus at higher temperatures, and has a problem that the sufficient effect of suppressing the pushing-out cannot be developed as the temperature of the tire elevates during the high-speed running. Since a filament composed of the polyethylene terephthalate does not have a functional group on its surface, the adhesiveness to rubber is remarkably inferior as compared with that of the nylon in the adhesive treatment with a usual RFL adhesive liquid. Therefore, the use of the polyethylene terephthalate in the belt reinforcing layer can lower the road noise and flat spot, but has a problem that the high-speed durability deteriorates notably.

On the contrary, in order to improve the high-speed durability of the tire wherein the cords made of the polyethylene terephthalate are used in the belt reinforcing layer, there are proposed many means for improving the adhesiveness between cord and rubber (JP-A-2001-9927, JP-A-2001-63312, JP-A-2001-98245 and JP-A-2000-248254).

SUMMARY OF THE INVENTION

However, even if the adhesiveness of the polyethylene terephthalate cords is improved by the means described in the above patent documents, it is still inferior to the adhesiveness of the nylon cords, so that the tire using the polyethylene terephthalate cords in the belt reinforcing layer is still inferior in the high-speed durability to the tire using the nylon cords in the belt reinforcing layer.

It is, therefore, an object of the invention to solve the above-mentioned problems of the conventional techniques and to provide a pneumatic radial tire wherein the polyethylene terephthalate cord is applied to the belt reinforcing layer and the high-speed durability is improved.

The inventor has made various studies in order to achieve the above object and discovered that the pushing-out degree of the belt in the high-speed running can be suppressed by defining an elastic modulus of the polyethylene terephthalate cord to a certain value or more in the tire using such a cord in the belt reinforcing layer and also the stress at the leading-trailing time of the tire can be decreased to improve the high-speed durability of the tire, and as a result the invention has been accomplished.

That is, the pneumatic radial tire according to the invention is a pneumatic radial tire comprising a radial carcass, a belt disposed outside a crown portion of the carcass in a radial direction and comprised of at least two belt layers, and a belt reinforcing layer disposed outside the belt in the radial direction, and is characterized in that the belt reinforcing layer is formed by continuously and spirally winding a polyethylene terephthalate cord(s) in a circumferential direction of the tire, and this cord has an elastic modulus of not less than 2.5 mN/dtex·% under a load of 29.4 N measured at 160° C.

In the invention, the elastic modulus under the load of 29.4 N measured at 160° C. is calculated by converting a gradient of a tangent (N/%) in a load-elongation curve of the cord measured at 160° C. at a point corresponding to the load of 29.4 N into a value per 1 dtex. At this point, the gradient of the tangent in the load-elongation curve at the point corresponding to the load of 29.4 N means a gradient of a tangent S in a load-elongation curve C of the cord at a point corresponding to the load of 29.4 N as shown in FIG. 1.

In a preferable embodiment of the pneumatic radial tire according to the invention, the cord is treated with an adhesive composition comprising a thermoplastic polymer (A), a heat-reactive aqueous polyurethane resin (B) and an epoxy compound (C), wherein a main chain of the thermoplastic polymer (A) does not substantially have an addition-reactive carbon-carbon double bond but has at least one crosslinkable functional group as a pendant group.

In another preferable embodiment of the pneumatic radial tire according to the invention, the cord is treated with an adhesive composition comprising a thermoplastic polymer (A), a heat-reactive aqueous polyurethane resin (B), an epoxy compound (C) and a rubber latex (D), wherein a main chain of the thermoplastic polymer (A) does not substantially have an addition-reactive carbon-carbon double bond but has at least one crosslinkable functional group as a pendant group.

At this moment, it is more preferable that the main chain of the thermoplastic polymer (A) is composed of an ethylenically addition polymer mainly having a straight-chain structure and/or a polyurethane based polymer, and the crosslinkable functional group as a pendant group is at least one selected from the group consisting of an oxazoline group, a bismaleimido group, a (blocked) isocyanate group, an aziridine group, a carbodiimido group, a hydrazino group, an epoxy group and an epithio group.

In the other preferable embodiment of the pneumatic radial tire according to the invention, the cord is subjected to an adhesive treatment (dip treatment) under a tension of not less than $6.9 \times 10^{-2}$ N/dtex.

In a further preferable embodiment of the pneumatic radial tire according to the invention, the cord has a twisting coefficient α of 500-2500 defined by the following equation (I):

$$\alpha = T \times D^{1/2} \quad (I)$$

(wherein α is a twisting coefficient, T is a twisting number and D is a total fineness (dtex) of the cord).

In another preferable embodiment of the pneumatic radial tire according to the invention, the cord has an elongation percentage of not more than 2% in the tire after vulcanization with respect to an original length of the cord before vulcanization.

In the other preferable embodiment of the pneumatic radial tire according to the invention, the cord has a total fineness of 1000-3500 dtex.

According to the invention, the pneumatic radial tire having an improved high-speed durability can be provided by defining the elastic modulus of the polyethylene terephthalate cord used in the belt reinforcing layer of the tire to a certain value or more. In the tire, the pushing-out degree in the high-speed running is suppressed and the stress in leading-trailing time of the tire is decreased, so that the deterioration of the high-speed durability due to a lack of adhesiveness between the cord and the rubber as compared to the nylon cords is sufficiently compensated. Furthermore, the adhesiveness between the cord and the rubber at high temperatures can be improved by treating the cord with the adhesive composition containing the specific compound to further improve the high-speed durability.

BEST MODE FOR CARRYING OUT THE INVENTION

Figure 1:
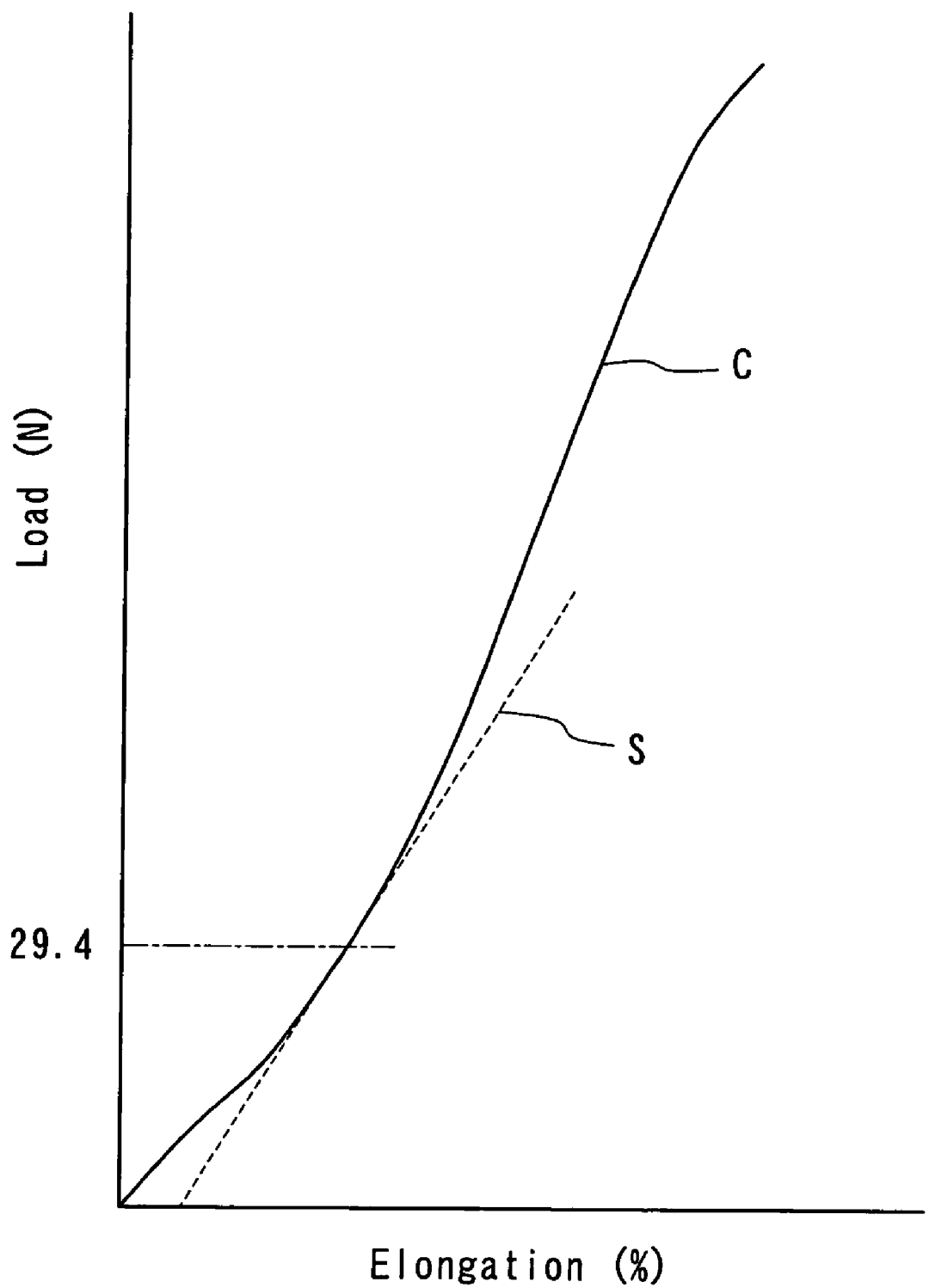
FIG. 1 shows a load-elongation curve of a cord.

The invention will be described in detail below. The pneumatic radial tire of the invention comprises a radial carcass, a belt disposed outside a crown portion of the carcass in a radial direction and comprised of at least two belt layers, and a belt reinforcing layer disposed outside the belt in the radial direction, and is characterized in that the belt reinforcing layer is formed by continuously and spirally winding a polyethylene terephthalate cord(s) in a circumferential direction of the tire, and this cord has an elastic modulus of not less than 2.5 mN/dtex·% under a load of 29.4 N measured at 160° C. At this moment, the reason why the elastic modulus is measured at 160° C. is due to the fact that as the temperature inside the tire rises according to the high-speed running, the temperature of the belt reinforcing layer reaches at 160° C. at a time of causing the tire trouble in the high-speed running test. Particularly, the elastic modulus of the polyethylene terephthalate cord at higher temperatures has an important meaning because such a cord is large in the lowering of the elastic modulus at an elevated temperature as compared to a room temperature and cannot develop the effect of sufficiently suppressing the pushing-out unless a high elastic modulus can be maintained at the elevated temperature even in the cord having a high elasticity at the room temperature.

In the pneumatic radial tire according to the invention, the polyethylene terephthalate cord used in the belt reinforcing layer has an elastic modulus of not less than 2.5 mN/dtex·% under a load of 29.4 N measured at 160° C. The pushing-out degree of the belt in the high-speed running can be suppressed by rendering the elastic modulus of the cord at 160° C. under a load of 29.4 N into not less than 2.5 mN/dtex·%, and hence the stress at the leading-trailing time of the tire can be decreased to improve the high-speed durability. Therefore, the deterioration of the high-speed durability due to the lack of the adhesiveness between the cord and the rubber as compared to the nylon cords can be sufficiently compensated to develop the sufficient high-speed durability.

In the pneumatic radial tire of the invention, the polyethylene terephthalate cord used in the belt reinforcing layer is preferable to be subjected to a dipping treatment under a high tension in order to improve the elastic modulus at 160° C. The inventor has examined the high-speed durability when the tension applied to the cord in the dipping treatment is adjusted to prepare polyethylene terephthalate cords having various elastic moduli and the resulting dipped cords are rubberized and applied to the belt reinforcing layer, and as a result, it has been discovered that the deterioration of the high-speed durability due to the lack of the adhesiveness can be compensated by improving the effect of suppressing the pushing-out through the increase of the elastic modulus when the elastic modulus under the load of 29.4 N measured at 160° C. reaches 2.5 mN/dtex·%, whereby the high-speed durability equal to that of the tire using the nylon cords in the belt reinforcing layer can be realized.

In order to make the elastic modulus of the cord sufficiently high, the tension in the adhesive treatment is preferable to be not less than $6.9 \times 10^{-2}$ N/dtex. When the tension in the adhesive treatment is less than $6.9 \times 10^{-2}$ N/dtex, it is difficult to sufficiently enhance the elastic modulus of the cord at the high temperature. The method for making the elasticity of the cord high is not limited, but other methods such as low twisting of the cord and so on may be used. The above adhesive treatment comprises a dry process, a hot process, a normalizing process or the like, and is conducted by properly adjusting the temperature and time in addition to the tension. Although the adhesive treatment may be carried out by one-bath treatment or two-bath treatment in the invention, the two-bath treatment is preferable. In the latter case, it is preferable that the tension of not less than $6.9 \times 10^{-2}$ N/dtex is applied to the cord in the second bath during the hot process.

The polyethylene terephthalate cord is preferable to have a twisting coefficient α of 500-2500 defined by the following equation (I):

$$\alpha = T \times D^{1/2} \quad (I)$$

(wherein α is a twisting coefficient, T is a twisting number and D is a total fineness (dtex) of the cord). When the twisting coefficient α of the cord is less than 500, the restraining force of filaments is weak and the adhesion is insufficient, while when it exceeds 2500, the elastic modulus enough to obtain the effect of suppressing the pushing-out can not be developed.

Moreover, the polyethylene terephthalate cord is preferable to have a total fineness of 1000-3500 dtex. When the total fineness of the cord is less than 1000 dtex, the elastic modulus enough to obtain the effect of suppressing the pushing-out can not be developed, while when it exceeds 3500 dtex, the end count can not be thickened and the rigidity per unit width can not be ensured sufficiently.

By the way, since a green tire extends in a radial direction of the tire by several % during the vulcanization, if the elastic modulus of the cord used in the belt reinforcing layer is high, the cord cannot follow the extension of the tire during the vulcanization and there is a possibility that the cords in the belt reinforcing layer directly come in contact with the steel cords in the belt via no rubber. For this end, it is necessary that the gauge between the belt and the cord is sufficiently ensured by previously designing the diameter of the green tire to have a certain size and also by properly adjusting the tension in the formation of the belt reinforcing layer by spirally winding the rubberized cord. Therefore, the polyethylene terephthalate cord is preferable to have an elongation percentage of not more than 2% in the tire after vulcanization with respect to an original length of the cord before vulcanization. When the tire is formed under the elongation percentage of the cord of more than 2%, the polyethylene terephthalate cord comes in contact with the belt and hence it is apt to easily cause the separation failure at the end of the belt during the running.

In the pneumatic radial tire of the invention, it is preferable that the polyethylene terephthalate cord is treated with an adhesive composition comprising a thermoplastic polymer (A), a heat-reactive aqueous polyurethane resin (B) and an epoxy compound (C), or an adhesive composition containing a rubber latex (D) in addition to the above components (A)-(C), wherein a main chain of the thermoplastic polymer (A) does not substantially have an addition-reactive carbon-carbon double bond but has at least one crosslinkable functional group as a pendant group. The adhesiveness of the cord to rubber at the high temperature can be improved by treating with the above-mentioned adhesive composition.

Heretofore, the adhesive treatment of the polyethylene terephthalate cord has been performed by a so-called two-bath treatment wherein an epoxy or an isocyanate is applied onto the surface of the cord and a resin (hereinafter referred to as RFL resin) prepared by mixing a resorcin, a formaldehyde and a latex is applied thereon. In such a treatment, however, the resin used in the first bath becomes very hard to increase a strain input to the cord and hence the fatigue characteristic of the cord deteriorates. Also, this resin can express the sufficient adhesion force between the cord and the rubber at room temperature, but has a problem that the adhesion force extremely lowers at the elevated temperature above 130° C. On the contrary, the sufficient adhesion to the rubber can be ensured even at the high temperature above 180° C. without hardening the cord by using the first bath mixture comprising the thermoplastic polymer (A) having at least one crosslinkable functional group as a pendant group but substantially containing no addition-reactive carbon-carbon double bond in the main chain structure, the heat-reactive aqueous polyurethane resin (B) and the epoxy compound (C).

The main chain of the thermoplastic polymer (A) mainly has a straight chain structure. As the main chain are preferable ethylenically addition polymers such as an acrylic polymer, a vinyl acetate based polymer, a vinyl acetate-ethylene based polymer and so on, or a polyurethane based polymer. However, the thermoplastic polymer (A) is not limited to the ethylenically addition polymers and the polyurethane based polymer, as far as it has a function that the functional group as the pendant group is crosslinked to control the fluidity of the resin at the high temperature and ensure the breaking strength of the resin.

As the functional group in the pendant group are preferable an oxazoline group, a bismaleimido group, a (blocked) isocyanate group, an aziridine group, a carbodiimido group, a hydrazino group, an epoxy group, an epithio group and so on.

As a monomer constituting the ethylenically addition polymer are mentioned an ethylenically unsaturated monomer having one carbon-carbon double bond and a monomer having two or more carbon-carbon double bonds. As the ethylenically unsaturated monomer having one carbon-carbon double bond are mentioned α-olefins such as ethylene, propylene, butylene, isobutylene and so on; α,β-unsaturated aromatic monomers such as styrene, α-methylstyrene, monochlorostyrene, vinyl toluene, vinyl naphthalene, sodium styrenesulfonate and so on; ethylenically carboxylic acids such as itaconic acid, fumaric acid, maleic acid, acrylic acid, methacrylic acid, butenetricarboxylic acid and so on and salts thereof; acid anhydrides such as maleic anhydride, itaconic anhydride and so on; unsaturated carboxylates such as methyl (metha)acrylate, ethyl (metha)acrylate, butyl (metha)acrylate, 2-ethylhexyl (metha)acrylate, methoxy polyethylene glycol (metha)acrylate, 2-hydroxyethyl (metha)acrylate, 2-aminoethyl (metha)acrylate and so on; monoesters of ethylenically dicarboxylic acids such as itaconic acid monoethyl ester, fumaric acid monobutyl ester, maleic acid monobutyl ester and so on; diesters of ethylenically dicarboxylic acids such as diethyl itaconate, dibutyl fumarate and so on; amides of α,β-ethylenically unsaturated acids such as acrylamide, maleic acid amide, N-methylol acrylamide, N-(2-hydroxyethyl) acrylamide, N-methylol methacrylamide, N-(2-hydroxyethyl) methacrylamide, maleic acid amide and so on; hydroxy group-containing monomers such as 2-hydroxyethyl (metha)acrylate, polyethylene glycol mono(metha)acrylate and so on; unsaturated nitriles such as acrylonitrile, methacrylonitrile, fumaronitrile, α-chloroacrylonitrile and so on; vinyl ethers such as methyl vinyl ether, ethyl vinyl ether and so on; vinyl ketones; vinyl amides; halogen-containing α,β-unsaturated monomers such as vinyl chloride, vinylidene chloride, vinyl fluoride, vinylidene fluoride and so on; vinyl compounds such as vinyl acetate, vinyl valerate, vinyl caprylate, vinylpyridine and so on; addition-polymerizable oxazolines such as 2-isopropenyl-2-oxazoline and so on; heterocyclic vinyl compounds such as vinylpyrrolidone and so on; unsaturated bond-containing silane compounds such as vinyl ethoxy silane, α-methacryloxypropyl trimethoxy silane and so on. They may be used alone or in a combination of two or more. In the invention, the thermoplastic polymer (A) is preferably obtained by radical addition polymerization of these monomers. As the monomer constituting the main chain structure and having two or more carbon-carbon double bonds are mentioned conjugated diene based monomers such as 1,3-butadiene, 2-methyl-1,3-butadiene, 2,3-dimethyl-1,3-butadiene, a halogen-substituted butadiene, e.g. chloroprene and so on; and non-conjugated diene based monomers such as vinyl norbornene, dicyclopentadiene, 1,4-hexadiene and so on. They may be used alone or in a combination of two or more.

The ethylenically addition polymer is composed of units derived from the ethylenic unsaturated monomer having one carbon-carbon double bond and the monomer having at least two carbon-carbon double bond. The carbon-carbon double bond reactive with sulfur is preferably not more than 10 mol % at the monomer composition ratio and more preferably 0 mol %, on the basis of a total amount of the monomers charged.

The method of introducing the crosslinkable functional group into the ethylenically addition polymer to prepare the thermoplastic polymer (A) is not particularly limited. For example, there can be adopted a method wherein an addition-polymerizable monomer having an oxazoline, an addition-polymerizable monomer having an epoxy group, an addition-polymerizable monomer having a maleimide, an addition-polymerizable monomer having a blocked isocyanate group, and an addition-polymerizable monomer having an epithio group are copolymerized in the polymerization of the ethlenically addition polymer.

The polyurethane based polymer is a high molecular weight polymer having in its molecule many bonds resulted from the reaction between isocyanate group and active hydrogen such as urethane bonds, urea bonds and so on obtained by mainly polyaddition-reacting a polyisocyanate and a compound having two or more active hydrogens. Moreover, the polymer may contain not only the bond resulted from the reaction between the isocyanate group and the active hydrogen but also an ester bond, an ether bond and an amide bond contained in the molecule of the active hydrogen-containing compound, and an uretodione bond, an carbodiimido group produced by the reaction among isocyanate groups, and so on.

As the heat-reactive aqueous polyurethane resin (B) is preferable a resin having at least two heat-dissociative blocked isocyanate groups in its molecule. For example, a heat-reactive aqueous polyurethane compound represented by the following general formula (II):

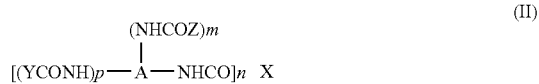

(wherein A is an isocyanate residue of an organic polyisocyanate compound having 3-5 functional groups, Y is an active hydrogen residue of a blocking agent compound alienating an isocyanate group by heat treatment, Z is an active hydrogen residue of a compound having at least one active hydrogen atom and at least one anion producing group in its molecule, X is an active hydrogen residue of a polyol compound having 2-4 hydroxyl groups and an average molecular weight of not more than 5000, n is an integer of 2-4, and p+m is an integer of 2-4 wherein m≧0.25) and so on are particularly preferable.

The epoxy compound (C) may be a compound containing at least two epoxy groups, preferably at least four epoxy groups in its molecule. Compounds having an epoxy group and a reaction product of polyalcohol and epichlorohydrin are preferable. As a concrete example of the epoxy compound are mentioned a reaction product of a polyvalent alcohol and epichlorohydrin such as diethylene glycol diglycidyl ether, polyethylene diglycidyl ether, polypropylene glycol diglycidyl ether, neopentyl glycol diglycidyl ether, 1,6-hexanediol diglycidyl ether, glycerol polyglycidyl ether, trimethylolpropane polyglycidyl ether, polyglycerol polyglycidyl ether, pentaerythritol polyglycidyl ether, diglycerol polyglycidyl ether, sorbitol polyglycidyl ether or the like; a novolak type epoxy resin such as phenol novolak type epoxy resin, cresol novolak type epoxy resin or the like; a bisphenol A type epoxy resin and so on.

The rubber latex (D) is not particularly limited, but vinylpyridine-styrene-butadiene copolymer latex, styrene-butadiene copolymer latex and so on are preferable.

In the treatment of the polyethylene terephthalate cord, it is preferable to use a treating solution containing the components (A), (B) and (C) as the first bath and a usual RFL solution as the second bath. Also, it is possible to conduct the treatment with a mixed solution containing the components (A), (B), (C) and (D) in only one bath. Moreover, it is preferable that the dry weight ratio of these components based on the dry weight of the adhesive composition is 2-75% in (A), 15-87% in (B), 11-70% in (C), and not more than 20% in (D).

The belt reinforcing layer in the radial tire according to the invention is formed by treating the polyethylene terephthalate cords with the adhesive composition, rubberizing them to form a narrow-width strip and spirally winding the strip continuously in a circumferential direction of the tire. The tire of the invention is not particularly limited except the cord used in the belt reinforcing layer and can be manufactured by using usual members according to the usual production method.

Figure 2:
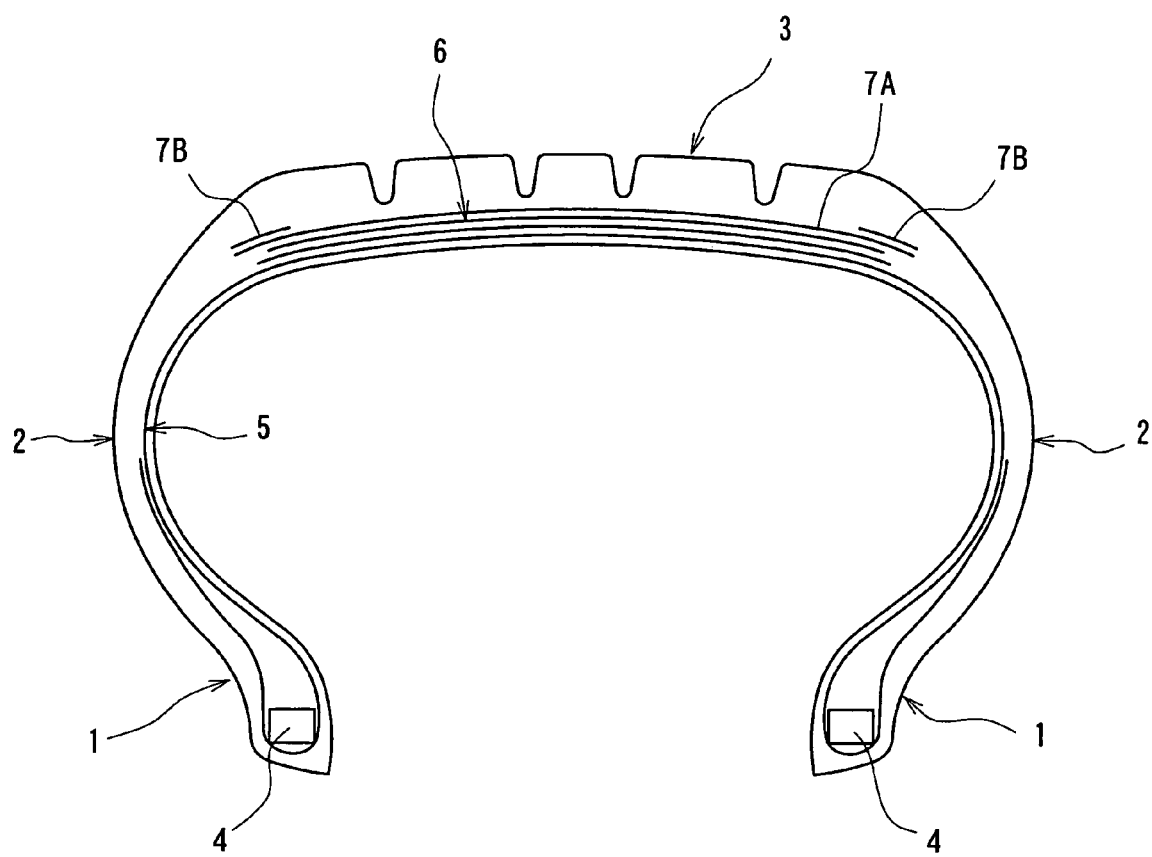
FIG. 2 is a cross-sectional view of an embodiment of the pneumatic radial tire according to the invention.

The pneumatic radial tire of the invention will be described in detail with reference to the drawing below. FIG. 2 is a cross-sectional view of an embodiment of the pneumatic radial tire according to the invention. The tire shown in FIG. 2 comprises a pair of bead portions 1, a pair of side portions 2, a tread portion 3, a carcass 5 toroidally extending between bead cores 4 embedded in the respective bead portions 1, a belt 6 disposed on a crown portion of the carcass 5 outward in a radial direction of the tire and comprised of at least two belt layers, a belt reinforcing layer 7A disposed on the belt 6 outward in the radial direction so as to cover the belt 6, and a pair of belt reinforcing layers 7B disposed so as to cover only both end portions of the belt reinforcing layer 7A. In this case, each of the belt reinforcing layers 7A, 7B is composed of a rubberized layer containing cords substantially arranged in parallel to the circumferential direction of the tire. Although the illustrated tire comprises the belt reinforcing layers 7A, 7B, a tire in which either of the belt reinforcing layers 7A, 7B is omitted is also an embodiment of the tire according to the invention. In the illustrated tire, each of the belt reinforcing layers 7A, 7B is composed of one layer, but it may be composed of two or more layers.

The following examples are given in illustration of the invention and are not intended as limitations thereof.

EXAMPLES

Cords shown in Table 1 are subjected to a dipping treatment in a two-bath system. A first bath in the dipping treatment comprises 16.5 mass % (solid content) of EPOCROS K1010E (made by Nippon Shokubai Co., Ltd., solid content: 40%, acryl-styrene copolymer emulsion having 2-oxazoline group, Tg of polymer: −50° C., amount of oxazoline group: 0.9 mmol/g.solid), 6 mass % (solid content) of ELASTRON BN27 (made by DAIICHI KOGYO SEIYAKU Co., Ltd., solid content: 30%, heat-reactive aqueous polyurethane resin having a molecular structure of methylene diphenyl), 7.5 mass % of DENACOL EX614B (made by NAGASE Chemicals Ltd., sorbitol polyglycidyl ether) and 70 mass % of water.

A second bath in the dipping treatment is prepared by adding 233.15 parts by mass of vinylpyridine-styrene-butadiene copolymer latex (JSR0655, made by JSR Corporation, solid content: 41%) and 207.00 parts by mass of styrene-butadiene copolymer latex (JSR2108, made by JSR Corporation, solid content: 40%) to 556.85 parts by mass of resorcin-formaldehyde aged solution comprising 524.01 parts by mass of water, 15.12 parts by mass of resorcin, 16.72 parts by mass of 37% formaldehyde and 4.00 parts by mass of 10% sodium hydroxide, and aging the mixture at room temperature for 16 hours.

When using the above first bath and the second bath, after the dry treatment is conducted under conditions that a dry temperature of the first bath is 205° C., a dry time of the first bath is 60 seconds, a tension at the dry treatment in the first bath is 1.2 kg/cord, a dry temperature of the second bath is 150° C., a dry time of the second bath is 160 seconds and a tension at the dry treatment in the second bath is 1.2 kg/cord, the hot treatment in the second bath is carried out under tension, temperature and treating time shown in Table 1.

Then, pneumatic radial tires having a tire size of 205/65R15 are prepared by using the above adhesive-treated cords in the belt reinforcing layer. At this moment, the belt reinforcing layer is formed by rubberizing the adhesive-treated cords with a rubber composition comprising 60.0 parts by mass of natural rubber, 40.0 parts by mass of SBR, 45.0 parts by mass of HAF grade carbon black, 2.0 parts by mass of spindle oil, 3.0 parts by mass of zinc oxide, 1.0 part by mass of an antioxidant (made by OUCHISHINKO CHEMICAL INDUSTRIAL Co., Ltd., NOCRAC 6C), 0.8 part by mass of a vulcanization accelerator (made by OUCHISHINKO CHEMICAL INDUSTRIAL Co., Ltd., NOCCELER NZ), 1.0 part by mass of stearic acid and 3.0 parts by mass of sulfur to form a strip having an end count of 50 cords/5 cm and a width of 5-20 mm and spirally winding the strip continuously in the circumferential direction of the tire. These tires have the same structure except that the cord having the structure shown in Table 1 is subjected to the dipping treatment under the conditions shown in Table 1 for use in the belt reinforcing layer. Moreover, the belt reinforcing layers in these tires have the structure shown in FIG. 2, in which the belt reinforcing layer 7A is wider than the belt by 5 mm in the widthwise direction of the tire, and the belt reinforcing layers 7B have a width of 30 mm. With respect to these tires, the high-speed durability, road noise and flat spot are evaluated by the following methods to obtain results shown in Table 1.

(1) High-Speed Durability

The tire is assembled onto a rim of 6J-15 and inflated under an air pressure of 200 kPa and then run at a speed of 150 km/h for 30 minutes, and thereafter the speed is increased every 6 km/h unless the trouble is not caused to measure a speed of causing the trouble. The result is shown by an index on the basis that the speed of causing the trouble in Comparative Example 1 is 100. The lager the index value, the higher the durable limitation speed and the better the high-speed durability.

(2) Road Noise

In an anechoic room, the tire inflated under an air pressure of 200 kPa is run on a drum having a rough surface and a diameter of 3 m at a speed of 60 km/h under a load of 4.7 kN, during which a sound pressure level is measured with a microphone arranged near to the surface of the drum. The result is shown by an index on the basis that the sound pressure level of Comparative Example 1 is 100. The lager the index value, the lower the road noise and the better the road noise.

(3) Flat Spot

After the tire is run on a drum for a predetermined time to sufficiently raise tire temperature and left to stand until the tire is completely cooled under loading, the deformation of the tire is measured and evaluated as a change of roundness. That is, the roundness is measured before and after the loading respectively, and the difference between the measured values is determined as a flat spot quantity. The result is shown by an index on the basis that the flat spot quantity of Comparative Example 1 is 100. The lager the index value, the lower the flat spot quantity and the better the flat spot.

As seen from Example 1 in Table 1, the elastic modulus of the cord under a load of 29.4 N measured at 160° C. can be made to not less than 2.5 mN/(dtex·%) by using PET instead of nylon as a material of the cord and making a tension at the hot treatment in the second bath to not less than $6.9 \times 10^{-2}$ N/dtex, and the high-speed durability of the tire can be improved by using the cord in the belt reinforcing layer as compared with the tire using the nylon cord in the belt reinforcing layer (Comparative Example 1). Also, the road noise and flat spot in the tire of Example 1 are improved because PET is used instead of nylon as a material of the cord.

On the contrary, although the road noise and flat spot are improved in the tires of Comparative Example 2 and 3 wherein the tension in the hot treatment of the second bath is low, the high-speed durability is inferior to that of Comparative Example 1 because the elastic modulus is insufficient and the deterioration of the high-speed durability due to the deterioration of the adhesiveness can not be compensated.

The invention claimed is:

1. A pneumatic radial tire comprising a radial carcass, a belt disposed outside a crown portion of the carcass in a radial direction and comprised of at least two belt layers, and a belt reinforcing layer disposed outside the belt in the radial direction, characterized in that the belt reinforcing layer is formed by continuously and spirally winding a polyethylene terephthalate cord(s) in a circumferential direction of the tire, and this cord has an elastic modulus of not less than 2.5 mN/dtex·% under a load of 29.4 N measured at 160° C.

2. A pneumatic radial tire according to claim 1, wherein the cord is treated with an adhesive composition comprising a thermoplastic polymer (A), a heat-reactive aqueous polyurethane resin (B) and an epoxy compound (C), wherein a main chain of the thermoplastic polymer (A) does not substantially have an addition-reactive carbon-carbon double bond but has at least one crosslinkable functional group as a pendant group.

3. A pneumatic radial tire according to claim 2, wherein the main chain of the thermoplastic polymer (A) is composed of an ethylenically addition polymer mainly having a straight-chain structure and/or a polyurethane based polymer, and the crosslinkable functional group as a pendant group is at least

TABLE 1

| | | Comparative Example 1 | Comparative Example 2 | Comparative Example 3 | Example 1 | Example 2 | Example 3 |
|---|---|---|---|---|---|---|---|
| Material of Cord used in Belt Reinforcing Layer | — | Nylon | Nylon | PET | PET | PET | PET |
| Cord Structure | dtex | 1400/2 | 1100/2 | 1100/2 | 1100/2 | 1100/2 | 1670/2 |
| Twisting Number (Cable Twist × Ply Twist) | number/100 mm | 13 × 13 | 47 × 47 | 47 × 47 | 47 × 47 | 26 × 26 | 39 × 39 |
| Twisting Coefficient | — | 688 | 2204 | 2204 | 2204 | 1219 | 2254 |
| Tension in hot treatment of second bath | $\times 10^{-2}$ N/tex | 5.20 | 2.67 | 3.57 | 8.92 | 8.92 | 8.92 |
| Temperature in hot treatment of second bath | ° C. | 230 | 240 | 240 | 240 | 240 | 240 |
| Treating time in hot treatment of second bath | seconds | 180 | 280 | 280 | 280 | 280 | 280 |
| Intermediate Elongation under a load of 44 N at room temperature | % | 4.84 | 4.40 | 3.33 | 2.68 | 2.26 | 1.84 |
| Elastic modulus under a load of 29.4 N at 160° C. | mN/dtex · % | 1.34 | 2.10 | 2.41 | 2.63 | 3.87 | 4.52 |
| Elongation percentage of cord after vulcanization | % | 2.5 | 2.2 | 2.0 | 1.9 | 1.7 | 1.5 |
| High-speed Durability | Index | 100 | 85 | 97 | 110 | 117 | 112 |
| Road Noise | Index | 100 | 102 | 105 | 107 | 113 | 110 |
| Flat Spot | Index | 100 | 104 | 107 | 123 | 134 | 142 | one selected from the group consisting of an oxazoline group, a bismaleimido group, an isocyanate group, an aziridine group, a carbodiimido group, a hydrazino group, an epoxy group and an epithio group.

4. A pneumatic radial tire according to claim 2, wherein the main chain of the thermoplastic polymer (A) is composed of an ethylenically addition polymer mainly having a straight-chain structure and/or a polyurethane based polymer, and the crosslinkable functional group as a pendant group is at least one selected from the group consisting of an oxazoline group, a bismaleimido group, a blocked isocyanate group, an aziridine group, a carbodimido group, a hydrazine group, an epoxy group and an epithio group.

5. A pneumatic radial tire according to claim 1, wherein the cord is treated with an adhesive composition comprising a thermoplastic polymer (A), a heat-reactive aqueous polyurethane resin (B), an epoxy compound (C) and a rubber latex (D), wherein a main chain of the thermoplastic polymer (A) does not substantially have an addition-reactive carbon-carbon double bond but has at least one crosslinkable functional group as a pendant group.

6. A pneumatic radial tire according to claim 5, wherein the main chain of the thermoplastic polymer (A) is composed of an ethylenically addition polymer mainly having a straight-chain structure and/or a polyurethane based polymer, and the crosslinkable functional group as a pendant group is at least one selected from the group consisting of an oxazoline group, a bismaleimido group, an isocyanate group, an aziridine group, a carbodiimido group, a hydrazino group, an epoxy group and an epithio group.

7. A pneumatic radial tire according to claim 5, wherein the main chain of the thermoplastic polymer (A) is composed of an ethylenically addition polymer mainly having a straight-chain structure and/or polyurethane based polymer, and the crosslinkable functional group as a pendant group is at least one selected from the group consisting of an oxazoline group, a bismaleimido group, a blocked isocyanate group, an aziridine group, a carbodiimido group, a hydrazine group, an epoxy group and an epithio group.

8. A pneumatic radial tire according to claim 1, wherein the cord is subjected to an adhesive dip treatment under a tension of not less than $6.9 \times 10^{-2}$ N/dtex.

9. A pneumatic radial tire according to claim 1, wherein the cord has a twisting coefficient $\alpha$ of 500-2500 defined by the following equation (I):

$$\alpha = T \times D^{1/2} \qquad (I)$$

wherein $\alpha$ is a twisting coefficient, T is a twisting number and D is a total fineness (dtex) of the cord.

10. A pneumatic radial tire according to claim 1, wherein the cord has an elongation percentage of not more than 2% in the tire after vulcanization with respect to an original length of the cord before vulcanization.

11. A pneumatic radial tire according to claim 1, wherein the cord has a total fineness of 1000-3500 dtex.

* * * * *